United States Patent
Lee et al.

(10) Patent No.: US 9,293,972 B2
(45) Date of Patent: Mar. 22, 2016

(54) APPARATUS FOR FORMING INSULATION FOR ELECTRICAL COMPONENTS

(71) Applicant: GENERAL ELECTRIC COMPANY, Schenectady, NY (US)

(72) Inventors: Martin Kin-Fei Lee, Schenectady, NY (US); Yang Cao, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 150 days.

(21) Appl. No.: 14/099,024

(22) Filed: Dec. 6, 2013

(65) Prior Publication Data

US 2015/0162811 A1 Jun. 11, 2015

(51) Int. Cl.
*B23P 19/00* (2006.01)
*H05K 13/04* (2006.01)
*H02K 15/10* (2006.01)

(52) U.S. Cl.
CPC .............. *H02K 15/10* (2013.01); *H02K 15/105* (2013.01); *Y10T 29/53152* (2015.01)

(58) Field of Classification Search
CPC ..... H02K 3/30; H02K 15/0414; H02K 15/10; H02K 15/105; Y10T 29/53074; Y10T 29/53078; Y10T 29/53091; Y10T 29/53113; Y10T 29/5313
USPC .................... 29/717, 718, 721, 726, 729, 734
See application file for complete search history.

(56) References Cited

U.S. PATENT DOCUMENTS

| | | | |
|---|---|---|---|
| 4,165,058 A | | 8/1979 | Whitener |
| 4,254,351 A | * | 3/1981 | Smith et al. ...................... 310/45 |
| 5,134,545 A | * | 7/1992 | Smith ........................... 361/712 |
| 5,314,984 A | * | 5/1994 | Markovitz et al. ............ 528/117 |
| 5,499,904 A | | 3/1996 | Wallace et al. |
| 7,634,852 B2 | * | 12/2009 | Sternberg et al. ............... 29/605 |
| 7,790,084 B1 | | 9/2010 | Wapner et al. |
| 8,192,169 B2 | | 6/2012 | Piasecki |
| 8,333,564 B2 | | 12/2012 | Krivcov et al. |
| 8,348,618 B2 | | 1/2013 | Hartman |

(Continued)

FOREIGN PATENT DOCUMENTS

WO 0064028 A1 10/2000
WO 2008088921 A2 7/2008

OTHER PUBLICATIONS

I. Baran et al., "Thermo-Chemical Simulation of a Composite Offshore Vertical Axis Wind Turbine Blade," Manufacturing Engineering, Department of Mechanical Engineering, Technical University of Denmark, 2012, pp. 1-8.

*Primary Examiner* — Paul D Kim
(74) *Attorney, Agent, or Firm* — Robert M. McCarthy

(57) ABSTRACT

Embodiments of an apparatus for forming insulation for an electrical component are provided herein. In one embodiment an apparatus for forming an insulation for an electrical component may include an actuator to pull an electrical component in a substantially linear direction, wherein the actuator is configured to move the electrical component in at least one direction relative to the substantially linear direction; a material source configured to provide a material to one or more surfaces of the electrical component as the electrical component is moved proximate the material source, wherein the material comprises at least a portion of an insulation; and a plurality of movable dies having inner surfaces disposed such that the material conforms to the one or more surfaces of the electrical component as the electrical component is moved through the plurality of movable dies.

20 Claims, 2 Drawing Sheets

(56) References Cited

U.S. PATENT DOCUMENTS 8,568,855 B2 * 10/2013 Segletes et al. ............... 428/137
2007/0269311 A1 11/2007 Browning
2010/0134232 A1 * 6/2010 Zillmann et al. ............. 336/192

* cited by examiner

APPARATUS FOR FORMING INSULATION FOR ELECTRICAL COMPONENTS

BACKGROUND

The subject matter disclosed herein generally relates to insulation for electrical components.

Conventional fabrication schemes utilized to form insulation for electrical components (e.g., stator bars) typically include a number of separate process steps performed in multiple apparatuses. For example, a typical fabrication process to form, for example, stator bars, may include a number of manual applications of insulating tape followed by exposing the insulating tape to a high pressure and/or high temperature to facilitate curing. However the inventors have observed that, due to the complexity and/or manual process steps, the conventional schemes are inefficient and produce non-uniform and defect containing parts.

Therefore, the inventors have provided an improved apparatus for forming insulation of electrical components.

SUMMARY

Embodiments of an apparatus for forming an insulation for electrical components are provided herein.

In one embodiment an apparatus for forming an insulation for an electrical component may include an actuator to pull an electrical component in a substantially linear direction, wherein the actuator is configured to move the electrical component in at least one direction relative to the substantially linear direction; a material source configured to provide a material to one or more surfaces of the electrical component as the electrical component is moved proximate the material source, wherein the material comprises at least a portion of an insulation; and a plurality of movable dies having inner surfaces disposed such that the material conforms to the one or more surfaces of the electrical component as the electrical component is moved through the plurality of movable dies.

In one embodiment, an apparatus for forming a stator bar may include an actuator to pull a stator bar core in a substantially linear direction, wherein the actuator is configured to move the stator bar core in at least one direction relative to the substantially linear direction; a material source configured to provide a material to one or more surfaces of the stator bar core as the stator bar core is moved proximate the material source, wherein the material comprises a reinforcing material; and a plurality of movable dies having inner surfaces disposed such that the material conforms to the one or more surfaces of the stator bar core as the stator bar core is moved through the plurality of movable dies.

The foregoing and other features of embodiments of the present invention will be further understood with reference to the drawings and detailed description.

DESCRIPTION OF THE FIGURES

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of the invention and are therefore not to be considered limiting in scope, for the invention may admit to other equally effective embodiments.

To facilitate understanding, identical reference numbers have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION OF PREFERRED EMBODIMENTS

Embodiments of an apparatus for forming an insulation for electrical components is provided herein. In at least one embodiment, the inventive apparatus may advantageously provide a reduction in a number of process steps typically performed to form such insulations, thereby making the process more efficient and less costly. In addition, reducing the number of process steps allows for the fabrication of the insulation having at least one of tighter tolerances, fewer defects, and increased uniformity, as compared to insulations formed via conventional formation schemes. In addition, in at least one embodiment, the inventive apparatus may automate process steps that would otherwise be performed manually, thereby further increasing efficiency and reducing cost. While not intending to be limiting in scope, the inventors have observed that the inventive apparatus may be advantageously utilized in the formation of insulations for components of electrical machines, such as stator bars for applications, for example, such as power generators, motors, or the like.

Figure 1:
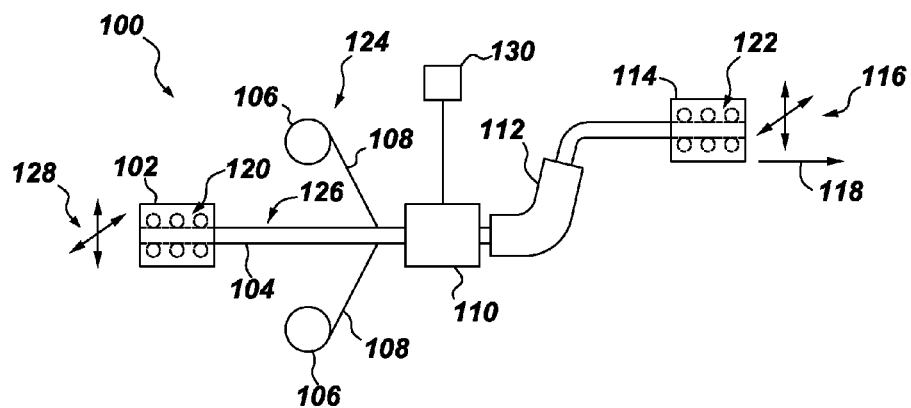
FIG. 1 depicts an apparatus for forming an insulation for electrical components in accordance with some embodiments of the present invention.

Referring to FIG. 1, in one embodiment, an apparatus 100 for forming an insulation for an electrical component 104 may generally include an actuator 114, a plurality of movable dies 112 and a material source 124. The electrical component 104 may be any type of component for which an insulation is to be formed. For example, in one embodiment the electrical component 104 may be a fully or partially fabricated stator bar (e.g., a stator bar core).

The actuator 114 is configured to pull the electrical component 104 in a substantially linear direction (indicated by arrow 118) (e.g., an "axis of pultrusion") through the apparatus 100. The actuator 114 may be any type of actuator suitable to pull the electrical component 104 through the apparatus 100 and may be dependent on size, shape or weight of the electrical component 104. For example, in one embodiment, the actuator 114 may include a plurality of driven (e.g., motor driven) rollers (shown in phantom at 122) configured to interface with the electrical component 104 to facilitate pulling the electrical component 104 through the apparatus 100. In such an embodiment, one or more belts (not shown) may be disposed about the rollers 122 (e.g., a caterpillar puller) to facilitate pulling the electrical component 104 through the apparatus 100. In another example, in one embodiment, the actuator 114 may include a reciprocating puller (e.g., a plurality of moving clamps) configured to facilitate pulling the electrical component 104 through the apparatus 100.

The inventors have observed that conventional actuators utilized to pull a component through one or more stations of an apparatus (e.g., a pultrusion apparatus) typically include a stationary pulling mechanism configured to pull substantially straight stock through the apparatus. However, such actuators are incapable of accommodating stock having complex shapes (e.g., such as one or more curved or rotated portions along the stock), for example, such as a stator bar.

As such, in one embodiment, the actuator 114 may be configured to move in at least one direction (e.g., such as shown by the arrows indicated at 116) relative to the linear direction 118 to accommodate for the size and/or shape of the electrical component 104 to facilitate pulling the electrical component 104 through the apparatus 100. In one embodiment, the movement of the actuator 114 may be facilitated by movement of the entire actuator 114. Alternatively, or in combination, in one embodiment, the movement of the actuator 114 may be facilitated by movement of one or more components of the actuator 114, for example such as the rollers 122.

In one embodiment, the apparatus 100 includes a feeder 102 configured to facilitate providing the electrical component 104 to the apparatus 100. In one embodiment, the feeder 102 includes a plurality of rollers (shown in phantom at 120) configured to interface with the electrical component 104. When present, the rollers 120 function to maintain the electrical component 104 in a desired orientation as the electrical component 104 is fed to the apparatus 100. The rollers 120 may roll freely, or, alternatively, be motor driven. In one embodiment, similar to the actuator 114, as discussed above, at least one of the feeder 102 or rollers 120 may move in at least one direction (e.g., such as shown by the arrows indicated at 128) relative to the linear direction 118 to accommodate for the size and/or shape of the electrical component 104 to facilitate feeding the electrical component 104 to the apparatus 100.

The material source 124 provides a material 108 to at least one surface 126 of the electrical component 104 via one or more spools 106 as the electrical component 104 is moved proximate the material source 124. The material 108 may be any type of material suitable to form at least a portion of the insulation, for example, in one embodiment, such as a reinforcing material. In such an embodiment, the reinforcing material may include any type of material suitable to provide a sufficient mechanical strength to facilitate application of the insulation to the electrical component 104. For example, in one embodiment, the reinforcing material may be a polymer containing backing, for example such as a fiberglass, fabric or tape. In one embodiment, the reinforcing material may include one or more additional components of the insulation disposed on or impregnated therein. The one or more additional components of the insulation may include any materials suitable to provide desired thermal, mechanical, and/or electrical properties to the insulation. For example, in one embodiment, the one or more additional components may include a resin (silicone rubber, ethylene propylene rubber, or the like), polymers (epoxies, polyesters, polyurethanes, or the like), a filler (e.g., oxides, nitrides, clays, nanoclays, or the like), combinations thereof, or the like.

In one embodiment, the apparatus 100 may include an applicator 110 disposed between the material source 124 and the plurality of movable dies 112 to provide a resin to the material 108 supplied by the material source 124. The applicator 110 may be any type of device suitable to provide the resin to the material 108, for example, an injection or deposition system, a bath, a combination thereof, or the like. In one embodiment, a material feed 130 may be coupled to the applicator 110 to provide a supply of the resin to the applicator 110.

The resin may be any resin suitable to provide desired thermal and/or electrical properties to the insulation. For example, in one embodiment, the resin may comprise at least one of rubbers (silicone rubber, ethylene propylene rubber, or the like), polymers (epoxies, polyesters, polyurethanes, or the like), combinations thereof, or the like. In addition, the resin may include fillers dispersed throughout the resin to provide one or more properties (e.g., electrical properties, thermal properties, mechanical properties, or the like) to the insulation. The fillers, may include one or more of oxides, nitrides, clays (e.g., nanoclays), combinations thereof, or the like.

The plurality of movable dies 112 (discussed in more detail below) function to conform the material 108 and resin atop the electrical component 104 to a desired thickness. By utilizing movable dies, the inventors have observed that each of the dies of the plurality of movable dies 112 may be moved or oriented to accommodate for an object having a complex shape (e.g., a stator bar core) to be moved through the plurality of movable dies 112, as compared to, for example, a conventional pultrusion apparatus having a single, non-movable die that can only accommodate a substantially uniform and/or linear object. As such, the inventors have observed that multiple degrees of motion (e.g., six degrees of motion) may be achieved by utilizing the plurality of movable dies 112. In one embodiment, at least die of the one of the plurality of movable dies 112 may be heated to facilitate curing the material 108 and resin as the electrical component 104 moves through the plurality of movable dies 112.

In an exemplary operation of the apparatus 100, to form, for example an insulation for a stator bar, the electrical component 104 (e.g., a preformed stator bar core) may be fed to the apparatus via the feeder 102. The electrical component 104 may be fed manually or via one or more motor driven rollers (e.g., rollers 120) of the feeder. The electrical component 104 is then pulled through the apparatus 100 via the actuator 114. As the electrical component 104 moves proximate the material source 124, the material 108 is deposited on at least one surface 126 of the electrical component 104. The electrical component 104 having the material 108 disposed thereon then passes through the applicator 110 where a resin is injected onto the material 108. The electrical component 104 then moves through the plurality of movable dies 112, where the dies conform the material 108 and resin to the electrical component 104 to a desired thickness and cure the material 108 and resin to form an insulation atop the electrical component 104.

By forming the insulation utilizing the inventive apparatus as described above, the inventors have observed that an overall number of process steps typically performed in conventional insulation forming processes may be reduced, thereby making the process more efficient and less costly. In addition, the inventive apparatus may automate process steps that would otherwise be performed manually, thereby providing an insulation having fewer defects as compared to an amount of defects typically found in conventionally fabricated insulations, producing less waste during fabrication and further increasing efficiency and reducing cost.

Moreover, the inventors have observed that by forming the insulation utilizing the inventive apparatus as described above, the insulation may be fabricated having an increased uniformity and tighter tolerances as compared to insulations fabricated via conventional methods. Such fabrication improvements may advantageously benefit performance of a device or machine for which the insulation is utilized. For example, the inventors have observed that in some high voltage applications, such as power generators, a substantial amount of space (e.g., side clearance) may be needed between certain components to accommodate for a thickness, and variations of the thickness, of conventional insulations utilized in the power generator. However, such space reduces an amount of heat transfer between components, thereby reducing efficiency and output of the power generator. As such, the inventors have observed that, by increasing uniformity and providing tighter tolerances of the insulation as compared to conventional insulating tapes fabricated via conventional methods, the side clearance discussed above may be reduced, thereby further heat transfer capability between the components and, thus increasing output and making the generator more efficient and cost effective.

Figure 2:
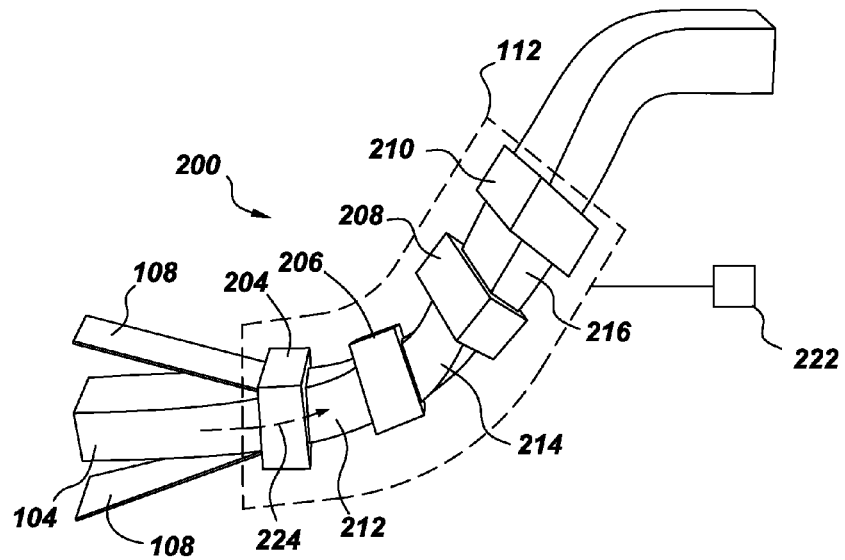
FIG. 2 depicts a portion of an apparatus for forming an insulation for electrical components in accordance with some embodiments of the present invention.

Referring to FIG. 2, the plurality of movable dies 112 may comprise any number of dies suitable to facilitate forming an insulation on the electrical component 104 as described herein. For example, in one embodiment, the plurality of movable dies 112 may include four dies (four dies 204, 206, 208, 210), such as shown in FIG. 2. As discussed above, by utilizing separate movable dies, the inventors have observed that each of the dies of the plurality of movable dies 112 may be moved or oriented to accommodate for an object having a complex shape (e.g., a stator bar core) to be moved through the plurality of movable dies 112. For example, the electrical component 104 may comprise one or more curved portions, rotated portions, combinations thereof, or the like (e.g., such as the curved and rotated portion 224 of the electrical component 104 shown in FIG. 2).

In one embodiment, each of the plurality of moveable dies 112 may be movably coupled to one another via one or more movable joints or flexible sections (movable joints 212, 214, 216 shown). Movably coupling each of the plurality of moveable dies 112 via the movable joints 212, 214, 216 may facilitate maintaining a desired distance between each of the dies 204, 206, 208, 210. The movable joints 212, 214, 216 may be any type of joints suitable to allow each of the plurality of moveable dies 112 to independently move. For example, in one embodiment, the movable joints 212, 214, 216 may comprise a mechanical hinge and/or a flexible material, for example a polymer, coupling adjacent dies of the plurality of moveable dies 112 to one another.

In one embodiment, at least one die 204, 206, 208, 210 of the plurality of movable dies 112 may have a different orientation with respect to another die 204, 206, 208, 210 of the plurality of movable dies 112. For example, in one embodiment, at least one of the dies (e.g., dies 206, 208, 210) may be rotated about a central axis 220 of the plurality of movable dies 112 at a different angle with respect to another die (e.g., die 204) of the plurality of movable dies 112. Varying the orientation of the plurality of movable dies 112 allows for the plurality of movable dies 112 to accommodate a rotated portion (e.g., the rotated portion 224 shown in FIG. 2) of the electrical component 104.

In one embodiment, the position and/or orientation of each of the plurality of movable dies 112 may be controlled via, for example, an actuator 222. Alternatively, or in combination, in one embodiment, the electrical component 104 may function as a guide to move the plurality of movable dies 112 into a desired position and/or orientation as the electrical component 104 moves through the plurality of movable dies 112. For example, as the electrical component 104 passes through the plurality of movable dies 112, an interaction between the electrical component 104 and inner surfaces (inner surfaces 340 described below with respect to FIG. 3) may cause the plurality of movable dies 112 to move into the desired position and/or orientation.

Figure 3:
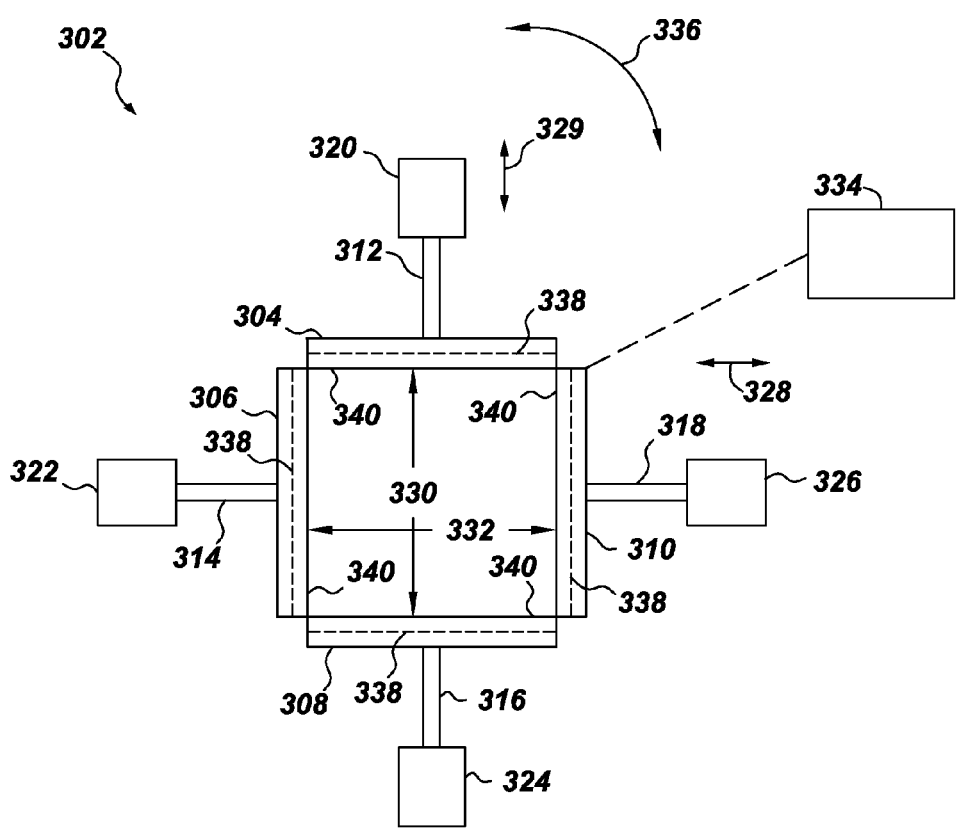
FIG. 3 depicts a portion of a die of an apparatus for forming an insulation for electrical components in accordance with some embodiments of the present invention.

FIG. 3 depicts an exemplary die 302 of the plurality of movable dies 112. In one embodiment, the die 302 generally comprises a plurality of sides (four sides 304, 306, 308, 310) each having inner surfaces (inner surfaces 340) disposed such materials disposed on one or more surfaces source (e.g., the materials 108 and/or resin provided to the surfaces 126 of the electrical component 104 described above) of the electrical component conform to the one or more surfaces of the electrical component.

The die 302 may be fabricated from any process compatible material suitable to facilitate the formation of an insulation as described herein. For example, in one embodiment, the sides 304, 306, 308, 310 of the die 302 may be fabricated from a metal, such as an aluminum, steel, alloys thereof, or the like.

The die 302 may be heated via any suitable mechanism to facilitate curing the material and resin as discussed above. For example, in one embodiment at least one side of the plurality of sides 304, 306, 308, 310 may comprise a heater 338 embedded within the side. The heater 338 may be any type of heater suitable to heat the die 302 to a desired temperature, for example such as resistance heater.

In one embodiment, at least one side 304, 306, 308, 310 of the die 302 is movable to control or vary one or more inner dimensions (inner dimensions 330, 332 shown) of the die 302. Varying one or more of the inner dimensions 330, 332 allows the die 302 to accommodate for an object having a complex shape (e.g., a stator bar core) to be moved through the die 302. Moreover, varying the one or more inner dimensions facilitates control of a thickness of the materials disposed on the electrical component to be controlled, thereby allowing for an overall thickness of the insulation to be controlled.

In one embodiment, movement (indicated by direction arrows 328, 329) of the least one side 304, 306, 308, 310 of the die 302 may be controlled via one or more actuators (four actuators shown 320, 322, 324, 326). In such an embodiment, the actuators 320, 322, 324, 326 may facilitate movement of the sides 304, 306, 308, 310 via a plurality of shafts (four shafts 312, 314, 316, 318 shown).

In one embodiment, the actuators 320, 322, 324, 326 may move the sides 304, 306, 308, 310 in response to a predetermined or monitored profile of the electrical component as the electrical component moves through the die 302. In such an embodiment, the actuators 320, 322, 324, 326 apply a force to the sides 304, 306, 308, 310 of the die 302 to facilitate controlling a thickness of the insulation as the electrical component moves through the die 302. Alternatively, the actuators 320, 322, 324, 326 may be configured to apply a constant pressure on the sides 304, 306, 308, 310 and allow the sides 304, 306, 308, 310 to move in response to an internal pressure applied to the inner surfaces 340 of the sides 304, 306, 308, 310 as the electrical component moves through the die 302.

In one embodiment, rotation of the die 302 (indicated by arrow 336) may be facilitated by an actuator 334 to control an orientation of the die 302 with respect to each of the other dies of the plurality of dies (as discussed above). Rotating the die 302 further allows the die 302 to accommodate for an object having a complex shape (e.g., a stator bar core) to be moved through the die 302. In one embodiment, the actuator 334 may rotate the die 302 in response to a predetermined or monitored profile of the electrical component as the electrical component moves through the die 302, or alternatively, may apply a constant pressure to the die 302 and allow the die 302 to move to move in response to an internal pressure applied to the inner surfaces 340 of the sides 304, 306, 308, 310 as the electrical component moves through the die 302.

Thus, embodiments of an apparatus for forming an insulation for an electrical component has been provided herein. In at least one embodiment, the inventive apparatus may advantageously provide a reduction in a number of process steps typically performed to form such insulations, thereby making the process more efficient and less costly and producing an insulation having at least one of tighter tolerances, fewer defects, and increased uniformity.

Ranges disclosed herein are inclusive and combinable (e.g., ranges of "about 30% to about 45%", is inclusive of the endpoints and all intermediate values of the ranges of "about 30% to about 45%" etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An apparatus for forming an insulation for an electrical component, comprising:
   an actuator to pull an electrical component in a substantially linear direction, wherein the actuator is configured to move the electrical component in at least one direction relative to the substantially linear direction;
   a material source configured to provide a material to one or more surfaces of the electrical component as the electrical component is moved proximate the material source, wherein the material comprises at least a portion of an insulation; and
   a plurality of movable dies having inner surfaces disposed such that the material conforms to the one or more surfaces of the electrical component as the electrical component is moved through the plurality of movable dies.

2. The apparatus of claim 1, wherein the electrical component is a stator bar core.

3. The apparatus of claim 1, wherein the plurality of movable dies are movably coupled to one another.

4. The apparatus of claim 3, wherein the plurality of movable dies are movably coupled to one another via a plurality of movable joints or a plurality of flexible sections.

5. The apparatus of claim 1, wherein at least one die of the plurality of movable dies comprises at least one side that is movable to control an inner dimension of the at least one die.

6. The apparatus of claim 5, further comprising an actuator coupled to the at least one side of the at least one die to control movement of the at least one side.

7. The apparatus of claim 1, wherein the plurality of movable dies are positioned such that at least one die is rotated about a central axis of the plurality of movable dies at a different angle with respect to another die of the plurality of dies.

8. The apparatus of claim 1, wherein the material is a reinforcing material.

9. The apparatus of claim 8, wherein the reinforcing material is fiberglass, fabric or tape.

10. The apparatus of claim 1, further comprising:
    an applicator disposed between the material source and the plurality of movable dies to provide a resin to the material provided by the material source.

11. The apparatus of claim 1, wherein at least one die of the plurality of movable dies comprises a heater to heat the die.

12. The apparatus of claim 1, wherein at least one die of the plurality of movable dies is independently rotatable about a central axis of the at least one die.

13. An apparatus for forming a stator bar, comprising:
    an actuator to pull a stator bar core in a substantially linear direction, wherein the actuator is configured to move the stator bar core in at least one direction relative to the substantially linear direction;
    a material source configured to provide a material to one or more surfaces of the stator bar core as the stator bar core is moved proximate the material source, wherein the material comprises a reinforcing material; and
    a plurality of movable dies having inner surfaces disposed such that the material conforms to the one or more surfaces of the stator bar core as the stator bar core is moved through the plurality of movable dies.

14. The apparatus of claim 13, wherein the plurality of movable dies are movably coupled to one another.

15. The apparatus of claim 14, wherein the plurality of movable dies are movably coupled to one another via a plurality of movable joints or a plurality of flexible sections.

16. The apparatus of claim 13, wherein at least one die of the plurality of movable dies comprises at least one side that is movable to control an inner dimension of the at least one die.

17. The apparatus of claim 13, wherein the plurality of movable dies are positioned such that at least one die is rotated about a central axis of the plurality of movable dies at a different angle with respect to another die of the plurality of dies.

18. The apparatus of claim 13, wherein the reinforcing material is fiberglass, fabric or tape.

19. The apparatus of claim 13, wherein at least one die of the plurality of movable dies comprises a heater to heat the die.

20. The apparatus of claim 13, wherein at least one die of the plurality of movable dies is independently rotatable about a central axis of the at least one die.

* * * * *